US012577420B2

(12) United States Patent
Yamada et al.

(10) Patent No.: US 12,577,420 B2
(45) Date of Patent: Mar. 17, 2026

(54) PIGMENT COMPOSITION, COLORING AGENT, AND INKJET INK

(71) Applicant: DIC Corporation, Tokyo (JP)

(72) Inventors: Shogo Yamada, Kamisu (JP); Yukiko Higuchi, Kamisu (JP); Akira Kimura, Kamisu (JP); Xia Yang, Qingdao (CN); Wei Zhao, Qingdao (CN)

(73) Assignee: DIC CORPORATION, Tokyo (JP)

( * ) Notice: Subject to any disclaimer, the term of this patent is extended or adjusted under 35 U.S.C. 154(b) by 211 days.

(21) Appl. No.: 18/288,329

(22) PCT Filed: Jul. 28, 2022

(86) PCT No.: PCT/JP2022/029083
§ 371 (c)(1),
(2) Date: Oct. 25, 2023

(87) PCT Pub. No.: WO2023/112375
PCT Pub. Date: Jun. 22, 2023

(65) Prior Publication Data
US 2024/0240039 A1 Jul. 18, 2024

(30) Foreign Application Priority Data
Dec. 14, 2021 (JP) ................................ 2021-202371

(51) Int. Cl.

| | |
|---|---|
| ***C09D 11/322*** | (2014.01) |
| ***B41J 2/01*** | (2006.01) |
| ***B41J 2/21*** | (2006.01) |
| ***C08K 5/3437*** | (2006.01) |
| ***C09B 48/00*** | (2006.01) |
| ***C09B 67/20*** | (2006.01) |

(Continued)

(52) U.S. Cl.
CPC ............... *C09D 11/322* (2013.01); *B41J 2/01* (2013.01); *B41J 2/2107* (2013.01); *C08K 5/3437* (2013.01); *C09B 48/00* (2013.01); *C09B 67/006* (2013.01); *C09C 3/06* (2013.01); *C09D 11/38* (2013.01); *C09D 17/00* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/16538; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS 3,386,843 A * 6/1968 Jaffe ....................... C09B 48/00 106/419
6,152,968 A * 11/2000 Etzbach ............... C09D 11/328 564/57

(Continued)

FOREIGN PATENT DOCUMENTS

JP 4232245 B2 3/2009
JP 2011-225834 A 11/2011

OTHER PUBLICATIONS

International Search Report dated Sep. 20, 2022, issued in counterpart International Application No. PCT/JP2022/029083 (3 pages).

*Primary Examiner* — Manish S Shah
(74) *Attorney, Agent, or Firm* — WHDA, LLP

(57) ABSTRACT

An object of the present invention is to provide a pigment composition that is suitable as an IJ ink and has high dispersion stability and excellent storage stability, a coloring agent containing the pigment composition, and, in particular, an IJ ink. The pigment composition of the present invention contains a quinacridone pigment and a compound represented by formula (I) below. In formula (I), n represents an integer of 1 to 8. At least C.I. Pigment Red 122 is preferably contained as the quinacridone pigment.

Formula (I)

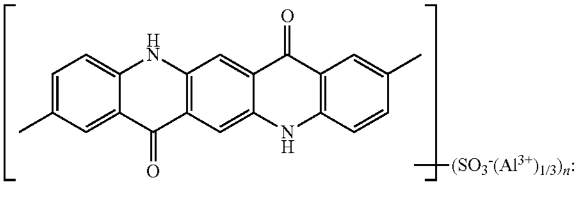

5 Claims, No Drawings

(51) Int. Cl.

| | |
|---|---|
| ***C09C 3/06*** | (2006.01) |
| ***C09D 11/38*** | (2014.01) |
| ***C09D 17/00*** | (2006.01) |

(56) References Cited

U.S. PATENT DOCUMENTS

| | | | | |
|---|---|---|---|---|
| 2004/0050290 | A1* | 3/2004 | Andrievsky ......... | C09D 11/328<br>106/31.77 |
| 2012/0140001 | A1* | 6/2012 | Birau ................... | C09D 11/322<br>106/31.77 |
| 2017/0183523 | A1* | 6/2017 | Deardurff ............ | C09D 11/322 |
| 2020/0377470 | A1* | 12/2020 | Shakhnovich ....... | C09D 11/322 |

* cited by examiner

PIGMENT COMPOSITION, COLORING AGENT, AND INKJET INK

TECHNICAL FIELD

The present invention relates to a pigment composition containing a quinacridone pigment, a coloring agent containing the pigment composition, and an inkjet (IJ) ink containing the coloring agent.

BACKGROUND ART

Quinacridone pigments are currently used as a coloring component of magenta-color IJ inks. The global market for IJ printing is a booming market expected to grow rapidly, showing a +9.4% increase in the year 2023 over the previous year compared to +0.8% in the overall printing industry (as forecasted by Smithers Pira). Thus, the demand for quinacridone pigments is also expected to steadily grow in the future, and quinacridone pigments constitute a very important product group.

It is known that derivatives obtained by treating quinacridone pigments with sulfonic acid are used in quinacridone pigment compositions to be used in IJ inks in order to reliably obtain dispersibility. For example, PTL 1 below discloses an acidic pigment derivative chemically modified by one or more acidic groups in a molecule, and discloses a compound having a sulfonic acid group as the acidic group (claims 1 and 2). Furthermore, PTL 1 discloses C.I. Pigment Red 122-sulfonic acid as the acidic pigment derivative ([0022]).

In addition, conventionally, dichloroquinacridone-sulfonic acid metal salts have been used as the sulfonic acid derivatives of quinacridone pigments. However, in recent years, dehalogenation of pigment compositions has been pursued due to the environmental and safety issues, and treatment agents other than dichloroquinacridone-sulfonic acid metal salts must be used in order to achieve dehalogenation.

CITATION LIST

Patent Literature

PTL 1: Japanese Unexamined Patent Application Publication No. 2011-225834

SUMMARY OF INVENTION

Technical Problem

The inventors of the present invention have studied the C.I. Pigment Red 122-sulfonic acid described in PTL 1 described above and found that a dispersion for IJ inks prepared therefrom exhibits a low initial viscosity but undergoes thickening after the storage test, revealing insufficient dispersion stability (Comparative Example 2 in the present application). Then the inventors of the present invention have conceived of changing the properties of the derivative by turning the sulfonic acid group into some form of metal salt so that the initial dispersibility and dispersion stability are both reliably obtained. In particular, the inventors have focused on polyvalent metal cations that interact between the derivative and the anionic substituent in the resin, selected aluminum as an inexpensive metal with a stable valency, and tested a C.I. Pigment Red 122-sulfonic acid aluminum salt. It has been found that this salt exhibits dispersibility superior to the dichloroquinacridone sulfonic acid metal salt and can achieve dehalogenation.

The present invention provides a pigment composition that is suitable for IJ inks and has high dispersion stability and excellent storage stability, a coloring agent containing the pigment composition, and, in particular, an IJ ink.

Solution to Problem

That is, the present invention relates to:

"Item 1: A pigment composition containing a quinacridone pigment and a compound represented by formula (I) below:

[Chem. 1]

formula (I)

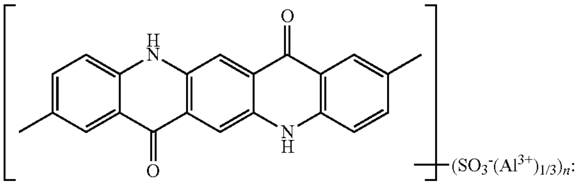

[In formula (I), n represents an integer of 1 to 8.]

Item 2: The pigment composition described in item 1, in which at least C.I. Pigment Red 122 is contained as the quinacridone pigment.

Item 3: The pigment composition described in item 1 or 2, in which a molecule having an m/z value of 541 in negative-mode of laser desorption/ionization mass spectrometry is contained as the compound represented by formula (I).

Item 4: The pigment composition described in any one of items 1 to 3, in which an amount of the compound represented by formula (I) contained relative to 100 parts by mass of the quinacridone pigment is 0.5 parts by mass or more and 20.0 parts by mass or less.

Item 5: A coloring agent containing the pigment composition described in any one of items 1 to 4.

Item 6: An inkjet (IJ) ink containing the coloring agent described in item 5."

Advantageous Effects of Invention

The pigment composition of the present invention has high dispersion stability and exhibits excellent storage stability when prepared into a dispersion for IJ. Thus, the pigment composition of the present invention is suitables as an IJ ink.

DESCRIPTION OF EMBODIMENTS

The present invention will now be described in detail.

Pigment Composition

A pigment composition of the present invention contains a quinacridone pigment and a compound represented by formula (I) below. Hereinafter, the compound represented by formula (I) is referred to as a pigment derivative (I).

[Chem. 2]

formula (I)

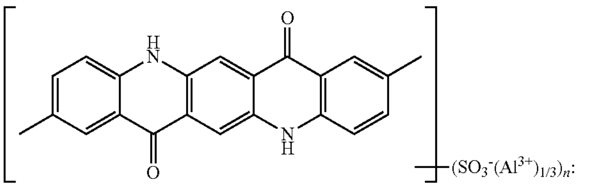

[In formula (I), n represents an integer of 1 to 8.]

The pigment derivative (I) is a structure in which some of hydrogen atoms in benzene rings constituting a quinacridone structure are substituted with sulfonic acid aluminum salts, and the number of substituents is represented by n. Typically, substitution position of such compounds are extremely difficult to identify. Identification of the pigment derivative (I) is mainly done by mass spectrometry.

The pigment composition of the present invention preferably contains, relative to 100 parts by mass of a quinacridone pigment, 0.5 parts by mass or more and 20.0 parts by mass or less of the pigment derivative (I). In addition, this content is more preferably 1.0 part by mass or more and 15.0 parts by mass or less and yet more preferably 1.5 parts by mass or more and 10.0 parts by mass or less. When the content is within the aforementioned range, higher dispersion stability is achieved, and, when a dispersion for IJ is prepared, the effect of excellent storage stability is obtained.

It is considered that, when an acrylic resin having a carboxylic acid group is used as the binder resin in the pigment composition of the present invention, the sulfonic acid aluminum salt in the pigment derivative (I) and the carboxylic acid group interact with each other, thereby increasing the amount of the binder resin adsorbing onto the pigment, creating the steric hindrance that keeps the pigment particles in the dispersion distant from each other, and thus improving the dispersion stability.

Description of Quinacridone Pigment

Examples of the quinacridone pigment used in the present invention include C.I. Pigment Red 122, C.I. Pigment Violet 19, C.I. Pigment Red 202, C.I. Pigment Red 207, and C.I. Pigment Red 209. In particular, industrially, C.I. Pigment Red 122 is important, and, in the present invention, at least C.I. Pigment Red 122 is preferably contained. The quinacridone pigment may be a solid solution pigment composed of more than one pigments of the aforementioned C.I. Pigment numbers, and examples thereof include a C.I. Pigment Red 122/C.I. Pigment Violet 19 solid solution, a C.I. Pigment Red 122/C.I. Pigment Red 202 solid solution, and a C.I. Pigment Red 202/C.I. Pigment Violet 19 solid solution, among which a C.I. Pigment Red 122/C.I. Pigment Violet 19 solid solution is particularly important.

Such a C.I. Pigment Red 122 may be a commercially available product or may be prepared by a known common method and used. An example of the known common method is a method that involves performing dehydratively cyclization of raw materials of a crude quinacridone pigment, such as 2,5-dianilinoterephthalic acid (raw material for C.I. Pigment Violet 19) and 2,5-di-toluidinoterephthalic acid (raw material for C.I. Pigment Red 122), in a polyphosphoric acid, adding the resulting product to water, and causing precipitation. The particle diameter is controlled by heating the crude quinacridone pigment in a liquid medium, and thus a quinacridone pigment can be obtained. The quinacridone pigment used in the present invention may have been subjected to a known treatment as appropriate after the manufacture. Quinacridone pigments other than C.I. Pigment Red 122 may be commercially available products or may be prepared by a known common method and used.

Description of Pigment Derivative (I)

As the pigment derivative (I), n in formula (I) is preferably 1 to 3 and more preferably 1 or 2. A compound with n representing 1 is expressed by formula (I-1) below:

[Chem. 3]

formula (I-1)

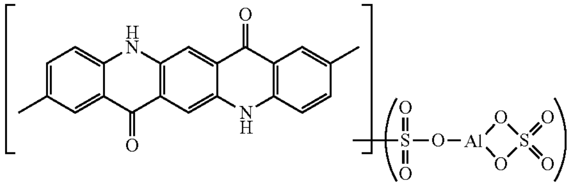

The pigment composition of the present invention preferably contains a molecule having an m/z value of 541 in negative-mode of laser desorption/ionization mass spectrometry. The molecule having an m/z value of 541 in the negative-mode laser desorption/ionization mass spectrometry is presumably a molecule (M-H)—resulting from proton (H+) elimination from the molecule having a structure represented by formula (I-1) described above. Thus, the presence of a molecule having an m/z value of 541 reveals that a compound represented by formula (I-1) above is contained. When the pigment composition of the present invention contains a molecule having an m/z value of 541, this molecule releases sulfate ions in the ink and gains divalent positive charges; thus, the binder resin more smoothly adsorbs onto the pigment, and the dispersion exhibits excellent dispersion stability.

One example of the method for producing the pigment derivative (I) will now be described. Although an example in which the compound represented by formula (I-1) above is contained as the pigment derivative (I) is described below, the same production method can be employed by appropriately adjusting the amounts of sulfuric acid and aluminum sulfate added for the case in which a compound other than the one represented by formula (I-1) is contained as the pigment derivative (I).

First, highly concentrated sulfuric acid is added to the C.I. Pigment Red 122, and a reaction is induced under heating to obtain a sulfonic acid-treated product of the quinacridone pigment. Subsequently, the sulfonic acid-treated product is reacted with an aluminum salt such as aluminum sulfate to obtain a pigment derivative (I).

The reaction between the C.I. Pigment Red 122 and sulfuric acid is performed at a temperature of 20 to 100° C. by heating for 1 to 48 hours under stirring. The amount of sulfuric acid (for example, 98 mass % sulfuric acid) used is, for example, 200 to 2000 parts by mass relative to 100 parts by mass of the C. I. Pigment Red 122. After the reaction, washing with an alcohol such as ethanol or pure water, filtration, and centrifugal separation are performed, and thus a sulfonic acid-treated product can be obtained as a wet cake.

Next, pure water is added to the sulfonic acid-treated product obtained as the wet cake, followed by heating and stirring, then an aqueous sodium hydroxide solution is added to adjust the pH to about 8 to 12, then an aluminum sulfate hydrate is added thereto, and the reaction is carried out under stirring. This reaction can be completed in about 10 to 60 minutes at a temperature of 20 to 90° C. Anhydrous aluminum sulfate or aluminum sulfate 14 to 18-hydrate can be used as the aluminum sulfate, and the amount thereof used is, for example, about 10 to 100 parts by mass relative to 100 parts by mass of the sulfonic acid-treated C.I. Pigment Red 122. After the reaction, the pH is adjusted to about 5.0 to 7.0 with an aqueous sodium hydroxide solution, and the resulting product is washed with pure water and filtered to obtain an aluminum sulfonate salt of C.I. Pigment Red 122 as a wet cake. The wet cake may be dried and ground into a powder.

Method for Producing Pigment Composition

Next, one example of the method for obtaining the pigment composition of the present invention is described; however, the interpretation of the present invention should not be limited by what is described below.

A wet cake of a quinacridone pigment (for example, C.I. Pigment Red 122) commercially supplied or prepared by a known common method is added to water or an organic solvent, and the resulting mixture is stirred to prepare a quinacridone pigment slurry. To this quinacridone pigment slurry, a dry powder, a wet cake, or a water/organic solvent-dissolve slurry of the pigment derivative (I) obtained as described above is added, followed by stirring. The resulting mixture is filtered, dried, and ground as appropriate to obtain a pigment composition of the present invention. The pH of the pigment composition may be adjusted as appropriate by using an aqueous sodium hydroxide solution or the like.

Coloring Agent

The coloring agent or the present invention may be any as long as the pigment composition of the present invention is contained. A coloring agent for IJ ink usage is particularly preferable as the coloring agent of the present invention.

IJ Ink

The aforementioned IJ ink preferably contains the pigment composition of the present invention, a solvent for dispersing the pigment composition, and a binder resin. The IJ ink of the present invention may further contain, as necessary, a wetting agent (drying inhibitor), a penetrant, a surfactant, and other additives such as a preservative, a viscosity adjustor, a pH adjustor, a chelating agent, a plasticizer, an antioxidant, and a UV absorber.

The solvent may be any, for example, an organic solvent, water, or a water-soluble solvent; however, water and/or a water-soluble solvent is preferable. In other words, the IJ ink of the present invention is preferably a water-based pigment dispersion since the effects of the pigment composition of the present invention described above are smoothly exhibited. Examples of the water-soluble solvent include alcohol components, and examples of the alcohol components include methanol, ethanol, isopropanol, and butanol. The water-soluble solvent may contain, in addition to the alcohol component, a glycol such as diethylene glycol, propylene glycol, or triethylene glycol, and a lower alkyl ether of a polyhydric alcohol, for example.

The binder resin is a resin used to improve the coating film resistance of the printed matter, and preferably contains an acrylic resin having a carboxylic acid group from the viewpoint of smoothly obtaining the effects of the pigment composition of the present invention. Examples of the acrylic resin include water-dispersible acrylic resins and water-soluble acrylic resins. In addition to the acrylic resins, polyvinyl alcohol, gelatin, polyethylene oxide, polyvinylpyrrolidone, urethane resin, epoxy resin, dextran, dextrin, carrageenan, agar, pullulan, water-soluble polyvinyl butyral, hydroxyethylcellulose, carboxymethylcellulose, etc., may be contained. Relative to the total amount of the IJ ink, 2 to 10 masse of the binder resin is preferably used.

The wetting agent is added to prevent drying of the ink. The amount of the wetting agent contained in the IJ ink to prevent drying is preferably 3 to 50 mass %. The wetting agent used in the present invention is not particularly limited, but is preferably miscible with water and preferably offers an effect of preventing clogging of the inkjet printer heads. Examples thereof include glycerin, ethylene glycol, diethylene glycol, triethylene glycol, polyethylene glycol with a molecular weight of 2000 or less, propylene glycol, dipropylene glycol, tripropylene glycol, 1,3-propylene glycol, isopropylene glycol, isobutylene glycol, 1,4-butanediol, 1,3-butanediol, 1,5-pentanediol, 1,6-hexanediol, mesoerythritol, and pentaerythritol. In particular, presence of propylene glycol and 1,3-butyl glycol offers safety and offers excellent effects in terms of the ink drying properties and discharge performance.

The penetrant is added to improve the penetrating properties into a recording medium and to adjust the dot diameters on a recording medium. Examples of the penetrant include lower alcohols such as ethanol and isopropyl alcohol, ethylene oxide adducts of alkyl alcohols such as ethylene glycol hexyl ether and diethylene glycol butyl ether, and propylene oxide adducts of alkyl alcohols such as propylene glycol propyl ether.

The surfactant is added to adjust the ink properties such as surface tension. The surfactant that can be added for this purpose is not particularly limited, and examples thereof include various anionic surfactants, nonionic surfactants, cationic surfactants, and amphoteric surfactants, among which anionic surfactants and nonionic surfactants are preferable.

Examples of the anionic surfactants include alkylbenzenesulfonates, alkylphenylsulfonates, alkylnaphthalenesulfonates, higher fatty acid salts, sulfate ester salts of higher fatty acid esters, sulfonates of higher fatty acid esters, sulfate ester salts and sulfonates of higher alcohol ethers, higher alkyl sulfosuccinates, polyoxyethylene alkyl ether carboxylates, polyoxyethylene alkyl ether sulfates, alkyl phosphates, and polyoxyethylene alkyl ether phosphates; and specific examples thereof include dodecyl benzene sulfonate, isopropylnaphthalenesulfonate, monobutylphenylphenolmonosulfonate, monobutylbiphenylsulfonate, and dibutylphenylphenoldisulfonate.

Examples of the nonionic surfactants include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkylamines, polyoxyethylene fatty acid amides, fatty acid alkylolamides, alkyl alkanolamides, acetylene glycol, oxyethylene adducts of acetylene glycol, and polyethylene glycol-polypropylene glycol block copolymers, among which polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adducts of acetylene glycol, and polyethylene glycol-polypropylene glycol block copolymers are preferable.

Examples of other surfactants include silicone surfactants such as polysiloxane oxyethylene adducts; fluorine surfactants such as perfluoroalkyl carboxylates, perfluoroalkyl sulfonates, and oxyethylene perfluoroalkyl ethers; and biosurfactants such as spiculisporic acid, rhamnolipid, and lysolecithin.

These surfactants can be used alone or as a mixture of two or more. When a surfactant is to be added, the amount thereof relative to the total mass of the ink is preferably in the range of 0.001 to 2 mass %, more preferably in the range of 0.001 to 1.5 mass, and yet more preferably in the range of 0.01 to 1 mass %. When the amount of the surfactant added is less than 0.001 mass %, the effects of adding the surfactant tend not to be displayed, and, at an amount exceeding 2 mass %, issues such as blurred images are likely to occur.

Other additives such as a preservative, a viscosity adjustor, a pH adjustor, a chelating agent, a plasticizer, an antioxidant, and a UV absorber can contain components typically used for the IJ usage as appropriate.

The physical properties of the ink are not particularly limited; however, considering the dischargeability as the IJ ink, the viscosity is preferably 1 to 10 (mPa·s) at a measurement temperature of 25° C., the surface tension is preferably 20 to 50 (mN/m), and the pigment concentration is preferably 1 to 10 mass %.

The IJ ink is obtained by adding a water-soluble solvent and/or water, an anionic group-containing organic polymer compound for the binder purposes, etc., to the pigment composition of the present invention described above to obtain a pigment dispersion, and then adding a wetting agent (drying inhibitor), a penetrant, and other additives according to the desired physical properties as necessary. After the ink is prepared, a centrifugal separation or filtering step may be further added.

The coloring agent of the present invention may have usages other than the IJ inks, for example, printing inks, paints, coloring agents for plastics, coloring agents for writing implements, printing agents, toners, dispersions and resists for color filters, and cosmetics.

Examples of the printing inks include gravure printing inks, offset printing inks, and flexo printing inks. Such a printing ink contains typical materials for printing inks such as a quinacridone pigment, a pigment other than the quinacridone pigment, a dye, a resin, oil or fat, a solvent, and various additives. Examples of the pigment other than the quinacridone pigment include organic pigments such as azo pigments (including azo lake, insoluble azo pigments, condensed azo pigments, chelate azo pigments, etc.), perylene pigments, perinone pigments, anthraquinone pigments, dioxazine pigments, thioindigo pigments, isoindolinone pigments, quinophthalone pigments, dye chelates (for example, basic dye-type chelates and acidic dye-type chelates), nitro pigments, nitroso pigments, and aniline black; synthetic inorganic pigments such as titanium oxide and carbon black; and special pigments such as pearl pigments and metal powders. Examples of the resin include, depending on the type and the usage of the ink, polyurethane (PU) resins, nitrocellulose (NC), polyamide (PA) resins, acrylic resins, chlorinated polypropylene, and vinyl chloride-vinyl acetate copolymer resins. Examples of the solvent include aromatic organic solvents such as toluene and xylene, ketone solvents such as methyl ethyl ketone, methyl isobutyl ketone, cyclohexanone, 2-heptanone, and 3-heptanone, ester solvents such as ethyl acetate, n-propyl acetate, isopropyl acetate, isobutyl acetate, propylene glycol monoethyl ether acetate, and propylene glycol monomethyl ether acetate, alcohol solvents such as methanol, ethanol, n-propanol, isopropanol, n-butanol, isobutanol, and t-butanol, (poly)alkylene glycol monoalkyl ether solvents such as propylene glycol monoethyl ether, propylene glycol monomethyl ether, ethylene glycol monomethyl ether, ethylene glycol monoethyl ether, ethylene glycol mono-n-propyl ether, ethylene glycol mono-i-propyl ether, diethylene glycol monomethyl ether, diethylene glycol monoethyl ether, diethylene glycol mono-n-propyl ether, and diethylene glycol mono-i-propyl ether, (poly)alkylene glycol monoalkyl ether acetate solvents such as ethylene glycol monomethyl ether acetate, ethylene glycol monoethyl ether acetate, diethylene glycol monomethyl ether acetate, and diethylene glycol monoethyl ether acetate, other ether solvents such as diethylene glycol dimethyl ether and diethylene glycol diethyl ether, and water. Examples of the fat and oil include animal and vegetable oils, processed oils, and mineral oils. Examples of various additives include anionic, nonionic, cationic, and amphoteric surfactants, rosins such as rubber rosin, polymerized rosin, disproportionated rosin, hydrogenated rosin, maleated rosin, cured rosin, and alkyd phthalate resins, pigment derivatives, dispersants, wetting agents, adhesion aids, leveling agents, antifoaming agents, antistatic agents, trapping agents, anti-blocking agents, and wax components.

Typical materials for paint (metal or plastic) usages, such as quinacridone pigments, pigments other than quinacridone pigments, resins, solvents, and various additives can be used as the paint. The aforementioned pigments other than quinacridone pigments can be used as the pigments other than quinacridone pigments. Depending on the usages, acrylic resins, urethane resins, silicone resins, fluorine resins, alkyl resins, epoxy resins, etc., can be used as the resin. Water-based solvents such as water and alcohols, toluene, xylene, ester, and ketone organic solvents, and terpene solvents can be used as the solvent. Depending on the usage, matting agents, surfactants, anti-sagging agents, antifoaming agents, anti-color separation agents, preservative/anti-mold agents, plasticizers, anti-skinning agents, and leveling agents can be used as the various additives.

Common materials for plastic coloring agent usages, such as quinacridone pigments, pigments other than quinacridone pigments, dyes, and various additives can be used as the coloring agent for plastics. The aforementioned pigments other than quinacridone pigments can be used as the pigments other than quinacridone pigments. Examples of the dye include azo and anthraquinone dyes. Examples of various additives include wax, heavy metal deactivators, alkaline metals, metal soaps of alkaline earth metals or zinc, hydrotalcite, antistatic agents composed of nonionic surfactants, cationic surfactants, anionic surfactants, or amphoteric surfactants, flame retardants such as halogen and phosphorus flame retardants and metal oxides, lubricants such as ethylene bisalkylamide, antioxidants such as phenol and phosphoric acid antioxidants, UV absorbers such as salicylic acid and benzotriazole UV absorbers, hindered amine light stabilizers, softeners, plasticizers, antifoam agents, light stabilizers, antibacterial agents, nucleating agents, crosslinking aids, silane coupling agents, anti-blocking agents, copper deactivators, neutralizing agents, processing auxiliary agents, and fillers.

Examples of the plastic resin to be colored by using the coloring agent of the present invention include polyamide (nylon), polyethylene terephthalate, polybutylene terephthalate, polycarbonate, polyimide, polyphenylene sulfide, polysulfone, polyethersulfone, polyether ether ketone, polyamideimide, acrylonitrile-styrene resins, polyester resins, acrylic resins, methacrylic-styrene resins, and ABS resins. The method for coloring these plastic resins may be a master batch method, a coloring pellet method, a dry color (color compound) method, a paste color method, and any other method.

Common materials for writing implement usages, such as quinacridone pigments, pigments other than quinacridone pigments, dyes, and various additives can be used as the coloring agent for writing implements. The aforementioned pigments other than quinacridone pigments can be used as the pigments other than quinacridone pigments. Examples of the dye include azo and anthraquinone dyes. Examples of various additives include UV absorbers, durability improvers such as antioxidants, anti-settling agents, releasing agents or releasability improvers, air fresheners, antibacterial agents, antifungal agents, plasticizers, and anti-drying agents. The writing implement may be a color ball-point pen, a marker, a color pencil, an artists' paint, a crayon, or the like.

Common materials for printing agent usages, such as quinacridone pigments, pigments other than the quinacridone pigments, acrylic and urethane binder resins, solvents such as water and organic solvents, and various additives can be used as the printing agent. The aforementioned pigments other than quinacridone pigments can be used as the pigments other than quinacridone pigments. Examples of various additives include crosslinking agents, thickeners, anti-clogging agents, retarding agents, and antifoaming agents. The printing method that uses the printing agent may be a printing method such as hand printing (hand print turn tables), machine printing (flat screen and rotary screen), dip dyeing, or the like, or a raw material (stock solution, solution, polymer, or the like) of chemical fibers may be directly colored (what is known as dope dyeing).

Common materials for toner usages, such as quinacridone pigments, pigments other than the quinacridone pigments, binder resins, magnetic powders, and various additives can be used as the toner. The aforementioned pigments other than quinacridone pigments can be used as the pigments other than quinacridone pigments. Examples of the binder resin include natural resins, synthetic resins, natural rubber, synthetic rubber, and synthetic wax that exhibit adhesion under application of heat or pressure. Examples of various additives include charge controlling agents (CCA) and releasing agents. The toner may be a one-component color magnetic toner that contains a magnetic material in the toner, a nonmagnetic one-component color toner that does not contain a magnetic material, or a two-component color developer toner containing a carrier mixed therein.

Specifically, the above-described dispersion for color filters is a liquid that contains a pigment used in color filters of liquid crystals and a solvent that disperses the pigment, and the above-described resist for color filters described is a liquid that contains, in addition to the dispersion, various additives such as a photosensitizer, a photoinitiator, and a leveling agent. Examples of the pigment include quinacridone pigments and pigments other than quinacridone pigments, and, in particular, examples of the pigments other than the quinacridone pigments include phthalocyanine, dioxazine, anthraquinone, and diketopyropyrrole typically used in color filter usages.

Typical materials for cosmetic usages such as quinacridone pigments, pigments other than quinacridone pigments, organic synthetic colorants such as dyes, natural colorants, inorganic pigments, pearl agents, glitter agents, solvents, and additives can be used as the cosmetics. Examples of the organic pigments other than the quinacridone pigments include Red No. 2, Red No. 3, Red No. 102, Red No. 104, Red No. 105, Red No. 106, Yellow No. 4, Yellow No. 5, Green No. 3, Blue No. 1, Blue No. 2, Red No. 202, Red No. 226, Yellow No. 401, carthamin, shikonin, and anthocyanin. Examples of the dye include tar dyes. Examples of the natural colorant include β-carotene, paprika pigments, and gardenia blue. Examples of the inorganic pigment include titanium oxide, zinc oxide, carbon black, red iron oxide, chromium oxide, yellow iron oxide, black iron oxide, ultramarine blue, and dark blue. Examples of the pearl agent include mica titanium, mica titanium oxide, and bismuth oxychloride. Examples of the glitter agent include aluminum-deposited film powders and laminated resin film powders. Examples of the solvent include oil components such as wax, oil, and mineral oil, and water-based components such as water and ethanol. Examples of the additives include chelating agents, wetting agents, rheology modifiers, emulsifiers, emollients, thickeners, preservatives, anti-surfactants, surfactants, stabilizers, neutralizers, vitamins, antioxidants, skin protectants, skin feel enhancers, gloss enhancers, fragrances, and binders.

The cosmetics may be of any type or have any usage or purpose, and may be any of foundations (face colors, concealers, etc.), makeup bases (makeup bases, pre-make-ups, etc.), powders (face powders), lipsticks (lipsticks, lip rouges, lip colors, lip pencils, paste rouges, lip glosses, lip liners, etc.), eye makeups (eyeshadows, eye colors, eyeliners, eyebrow pencils, eyebrow brushes, mascaras, eyelash cosmetics, etc.), cheek cosmetics (blushers, cheek colors, cheek rouges, etc.), nail cosmetics (nail enamels, manicures, nail colors, nail polishes, pedicures, nail lacquers, top coats, base coats, etc.), and hair colorings (hair dyes, hair color sprays, hair color sticks, coloring rinses, hair manicures, etc.).

EXAMPLES

The present invention will now be described in further detail through Examples and Comparative Examples. In Examples and Comparative Examples below, "%" indicates "mass %" unless otherwise noted.

In Examples, the m/z value in the negative-mode laser desorption/ionization mass spectrometry is measured by the following method. For the measurement, a matrix-assisted laser desorption/ionization time-of-flight mass spectrometer, JMS-S3000 produced by JEOL Ltd., was used. A suspension prepared by adding 20 mg of a sample in 10 mL of ethanol (produced by Kanto Chemical Co., Inc.) and ultrasonically suspending the sample therein was used as a measurement solution.

Measurement Conditions

Measurement sample: 1 μL of the measurement solution was applied to a 384-spot measurement plate produced by Hudson Surface Technology, Inc., and air-dried.

Measurement mode: spiral TOF, negative mode

Laser intensity: 50%

Delay time: 200 nanoseconds

Detector: 50%

Number of times of tracing: 200 to 250 shots (Preparation Example 1) [Synthesis of PR122SA]

To 100 parts of 98% sulfuric acid (produced by Kanto Chemical Co., Inc.), 10 parts of C.I. Pigment Red 122 (produced by DIC Corporation) was added, and the resulting solution was stirred at 100° C. for 24 hours. After the reaction solution was cooled to room temperature, 500 parts of ethanol (produced by Kanto Chemical Co., Inc.) was added thereto, followed by stirring for 1 hour, and then the resulting mixture was filtered and washed with 500 parts of ethanol. The obtained residue was added to 100 parts of pure water, was suspended by stirring, and was centrifugally separated into a liquid phase and a solid phase. The liquid phase was discarded, and the solid phase was taken out to obtain a wet cake of C.I. Pigment Red 122-sulfonic acid (PR122SA). This PR122SA was measured by negative-mode laser desorption/ionization mass spectrometry; however, no molecule having an m/z value of 541 was detected. This PR122SA is presumed to be the following compound (hereinafter, n in PR122SA is 1 or 2).

[Chem. 4]

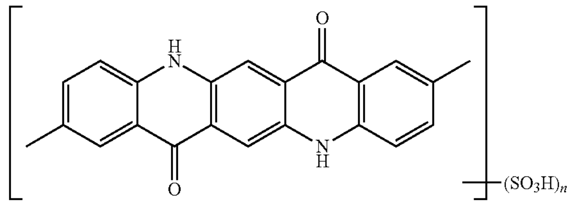

PR122SA (Preparation Example 2) [Synthesis of PR122SA-A1]

To 200 parts of pure water, 27 parts of the wet cake (solid content: 18.5%) of PR122SA was added, and the temperature thereof was elevated to 80° C. under stirring. After the lumps of the wet cake disappeared, the pH was adjusted to 11.5 with a 25% aqueous sodium hydroxide solution, followed by stirring for 30 minutes, and then 3.3 parts of aluminum sulfate 14 to 18-hydrate (produced by Kanto Chemical Co., Inc.) was added, followed by stirring for 30 minutes. The pH of the resulting mixture was adjusted to 6.0 with a 25% aqueous sodium hydroxide solution, and the resulting mixture was filtered to obtain a wet cake of an aluminum salt (PR122SA-A1) of C.I. Pigment Red 122-sulfonic acid represented by chemical formula (I-1). This PR122SA-A1 was measured by negative-mode laser desorption/ionization mass spectrometry, and a molecule having an m/z value of 541 was detected.

(Preparation Example 3) [Synthesis of PR209SA]

To 200 parts of 98% sulfuric acid (produced by Kanto Chemical Co., Inc.), 20 parts of C.I. Pigment Red 209 (produced by DIC Corporation) was added, and the resulting solution was stirred at 110° C. for 5 hours. After the reaction solution was cooled to room temperature, the reaction solution was poured into 1000 parts of cold water, followed by stirring for 1 hour, and the resulting solution was filtered and washed with water. The obtained residue was added to 800 mL of ethanol, was suspended by stirring, and was centrifugally separated into a liquid phase and a solid phase. The liquid phase was discarded, and the solid phase was taken out to obtain a wet cake of C.I. Pigment Red 209-sulfonic acid (PR209SA).

(Preparation Example 4) [Synthesis of PR209SA-A1]

A wet cake of an aluminum salt (PR209-SA) of C.I. Pigment Red 209-sulfonic acid was obtained as described above except that the wet cake of PR122SA in Preparation example 2 was changed to 29 parts of the wet cake (solid content: 17.1%) of PR209SA. This PR209SA-A1 was measured by negative-mode laser desorption/ionization mass spectrometry; however, no molecule having an m/z value of 541 could be detected.

(Synthesis Example 1) [Synthesis of Quinacridone Pigment Composition (QA-1)]

To 30 parts of pure water, 8.47 parts of the wet cake (solid content: 11.8%) of PR122SA-A1 was added, and the resulting mixture was stirred for 30 minutes to prepare a water slurry of PR122SA-A1. Separately, 93.9 parts of C.I. Pigment Red 122 (produced by DIC Corporation, solid content: 21.3%) was added to 400 parts of pure water, the temperature was elevated to 80° C. under stirring, and the pH was adjusted to 8.5 with a 25% aqueous sodium hydroxide solution. Thereto, a water slurry of PR122SA-A1 was added, followed by stirring for 30 minutes, and then the pH was adjusted to 7.0 with a 25% aqueous sodium hydroxide solution. Next, the reaction solution was filtered, washed with 2000 parts of pure water, air-dried (98° C., 18 hours), and ground to obtain a quinacridone pigment composition (QA-1).

(Synthesis Example 2) [Synthesis of Quinacridone Pigment Composition (QA-1')]

93.9 parts of C.I. Pigment Red 122 (produced by DIC Corporation, solid content: 21.3%) was air-dried (98° C., 18 hours), and ground to obtain a quinacridone pigment composition (QA-1').

(Synthesis Example 3) [Synthesis of Quinacridone Pigment Composition (QA-2')]

To 30 parts of pure water, 5.41 parts of the wet cake (solid content: 18.5%) of PR122SA was added, and the resulting mixture was stirred for 30 minutes to prepare a water slurry of PR122SA. Separately, 93.9 parts of C.I. Pigment Red 122 (produced by DIC Corporation, solid content: 21.3%) was added to 400 parts of pure water, the temperature was elevated to 80° C. under stirring, and the pH was adjusted to 8.5 with a 25% aqueous sodium hydroxide solution. Thereto, the water slurry of PR122SA was added, followed by stirring for 30 minutes, and then the pH was adjusted to 7.0 with a 25% aqueous sodium hydroxide solution. Next, the reaction solution was filtered, washed with 2000 parts of pure water, air-dried (98° C., 18 hours), and ground to obtain a quinacridone pigment composition (QA-2').

(Synthesis Example 4) [Synthesis of Quinacridone Pigment Composition (QA-3')]

To 30 parts of pure water, 5.85 parts of the wet cake (solid content: 17.1%) of PR209SA-A1 was added, and the resulting mixture was stirred for 30 minutes to prepare a water slurry of PR209SA-A1. Separately, 93.9 parts of C.I. Pigment Red 122 (produced by DIC Corporation, solid content: 21.3%) was added to 400 parts of pure water, the temperature was elevated to 80° C. under stirring, and the pH was adjusted to 8.5 with a 25% aqueous sodium hydroxide solution. Thereto, a water slurry of PR209SA-A1 was added, followed by stirring for 30 minutes, and then the pH was adjusted to 7.0 with a 25% aqueous sodium hydroxide solution. Next, the reaction solution was filtered, washed with 2000 parts of pure water, air-dried (98° C., 18 hours), and ground to obtain a quinacridone pigment composition (QA-3').

(Example 1 and Comparative Examples 1 to 3) [Preparation of Water-Based IJ Inks]

As indicated in Table 1 below, for each of the quinacridone pigment compositions obtained in Synthesis examples 1 to 4 described above, 10.0 parts of the quinacridone pigment composition, 7 parts (resin content: 3 parts) of a styrene-acrylic resin (DIC Corporation), 1.0 part of isopropanol (Kanto Chemical Co., Inc.), 9.7 parts of a 5% aqueous potassium hydroxide solution, 72.3 parts of pure water, and 250 parts of 0.5 mm zirconia beads were placed in a 100 mL wide-mouth polyethylene bottle, and dispersed with a paint shaker (produced by Toyo Seiki Seisaku-sho, Ltd.) for 2 hours to obtain a pigment dispersion. Subsequently, the obtained pigment dispersion was centrifugally separated by using a high-speed centrifugal machine H-2000B (produced by KOKUSAN Co. Ltd.) for 30 minutes at 6000 G, and the supernatant was taken to obtain a water-based pigment dispersion having a pigment concentration of 9.5%.

Then 42.1 parts of the water-based pigment dispersion, 1.0 part of SURFYNOL 465 (produced by Evonik Industries AG) as a surfactant, 15.0 parts of glycerin (produced by Kanto Chemical Co., Inc.) as a wetting agent, 10.0 parts of propylene glycol (produced by Kanto Chemical Co., Inc.), and pure water in an amount that made the total mass to 100 parts were mixed. Next, vacuum filtration was performed by using ME-Millipore SCWP (produced by Merck KGaA) and GLASS FIBER PREFILTERS AP25 (produced by Merck KGaA) so as to obtain a water-based IJ ink for evaluation having a pigment concentration of 4.0%.

Evaluation of Ink Viscosity Stability (Change in Viscosity)

The viscosities of the water-based IJ inks for evaluation immediately after preparation by the aforementioned method were measured in a 20° C. environment with an E-type viscometer (initial viscosity). Next, 10 mL of the water-based ink was sealed in a glass container and left to stand still at 70° C. for 2 weeks, and the viscosity of the IJ ink after standing was measured with an E-type viscometer (storage viscosity).

The change between before and after the storage test on the IJ ink was calculated from the following equation, and the dispersion stability was evaluated by the following standards.

$$\text{Change in viscosity (\%)} = (\text{storage viscosity} - \text{initial viscosity})/\text{initial viscosity} \times 100$$

Dispersion stability A: The change in viscosity was less than +10%.

Dispersion stability B: The change in viscosity was +10% or more but less than +50%.

Dispersion stability C: The change in viscosity was +50% or more.

The initial viscosity, the storage viscosity, the change in viscosity, and the dispersion stability of each of the obtained water-based IJ inks for evaluation are shown in Table 1.

TABLE 1

| | Quinacridone Pigment composition | Initial viscosity (mPa · second) | storage viscosity (mPa · second) | Change in viscosity | Dispersion stability |
|---|---|---|---|---|---|
| Example 1 | (QA-1) | 4.3 | 4.3 | ±0% | A |
| Comparative Example 1 | (QA-1') | 3.8 | 7.3 | +92% | C |
| Comparative Example 2 | (QA-2') | 3.9 | 6.2 | +37% | B |
| Comparative Example 3 | (QA-3') | 4.2 | 5.6 | +33% | B |

Table 1 shows that the pigment composition of the present invention in Example 1 has a small change in viscosity and better dispersion stability compared to the pigment composition of Comparative Example 1 that does not contain a pigment derivative, the pigment composition treated with C.I. Pigment Red 122-sulfonic acid in Comparative Example 2, and the pigment composition treated with an aluminum salt of C.I. Pigment Red 209-sulfonic acid in Comparative Example 3. Thus, the pigment composition of the present invention is suitable as a coloring agent, in particular, for IJ ink usages.

The invention claimed is:

1. A pigment composition comprising a quinacridone pigment and a compound represented by formula (I) below:

formula (I)

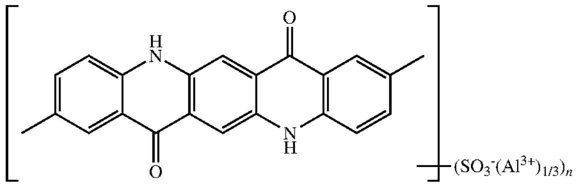

[In formula (I), n represents an integer of 1 to 8]

wherein at least C.I. Pigment Red 122 is contained as the quinacridone pigment.

2. The pigment composition according to claim 1, wherein a molecule having an m/z value of 541 in negative-mode of laser desorption/ionization mass spectrometry is contained as the compound represented by formula (I).

3. The pigment composition according to claim 1, wherein an amount of the compound represented by formula (I) contained relative to 100 parts by mass of the quinacridone pigment is 0.5 parts by mass or more and 20.0 parts by mass or less.

4. A coloring agent comprising the pigment composition according to claim 1.

5. An inkjet comprising the coloring agent according to claim 4.

* * * * *